United States Patent
Zhong et al.

(10) Patent No.: US 9,363,184 B2
(45) Date of Patent: Jun. 7, 2016

(54) TOKEN BUCKET-BASED TRAFFIC LIMITING METHOD AND APPARATUS

(71) Applicant: Huawei Technologies Co., Ltd., Shenzhen, Guangdong (CN)

(72) Inventors: Qingchang Zhong, Chengdu (CN); Guoming Shen, Shenzhen (CN); Dongchuan Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 14/229,499

(22) Filed: Mar. 28, 2014

(65) Prior Publication Data
US 2014/0293794 A1 Oct. 2, 2014

(30) Foreign Application Priority Data
Mar. 28, 2013 (CN) .......................... 2013 1 0102927

(51) Int. Cl.
*H04L 12/819* (2013.01)
*H04L 12/801* (2013.01)
*H04L 12/54* (2013.01)

(52) U.S. Cl.
CPC ........... *H04L 47/215* (2013.01); *H04L 12/5693* (2013.01); *H04L 47/10* (2013.01)

(58) Field of Classification Search
CPC .... H04L 47/215; H04L 47/10; H04L 12/5693
See application file for complete search history.

(56) References Cited

U.S. PATENT DOCUMENTS

| 8,320,240 | B2 * | 11/2012 | Kwan | H04L 12/5693 370/229 |
| 2006/0062144 | A1 * | 3/2006 | Testa | H04L 47/215 370/229 |
| 2008/0025214 | A1 * | 1/2008 | Bettink | H04L 47/10 370/230 |
| 2013/0003555 | A1 * | 1/2013 | Moran | H04L 47/10 370/235.1 |

FOREIGN PATENT DOCUMENTS

CN 102970238 A 3/2013
EP 2317701 A1 5/2011

OTHER PUBLICATIONS

Cisco, Medianet Reference Guide, Chapter 2: Medianet Bandwidth and Scalability, Oct. 26, 2010, p. 8.*

* cited by examiner

*Primary Examiner* — Chi H Pham
*Assistant Examiner* — Shailendra Kumar
(74) *Attorney, Agent, or Firm* — Leydig, Voit & Mayer, Ltd.

(57) ABSTRACT

The embodiments of the present invention disclose a token bucket-based traffic limiting method, including: when a packet is received, triggering a filling operation of filling each token bucket in a token bucket set under a scheduling node corresponding to the packet, where the token bucket set includes at least two token buckets; determining the number of tokens filled in each token bucket in the token bucket set according to a moment when the packet is received and a timestamp shared by the token bucket set; and if the number of tokens in a token bucket corresponding to the packet exceeds a length of the packet, allowing the packet to pass through the scheduling node and removing the number of tokens, corresponding to the length of the packet, from the token bucket corresponding to the packet.

17 Claims, 5 Drawing Sheets

TOKEN BUCKET-BASED TRAFFIC LIMITING METHOD AND APPARATUS

CROSS-REFERENCE TO RELATED APPLICATION

This application claims priority to Chinese Patent Application No. 201310102927.1, filed on Mar. 28, 2013, which is hereby incorporated by reference in its entirety.

TECHNICAL FIELD

The present invention relates to the communications field, and in particular, to a token bucket-based traffic limiting method and apparatus.

BACKGROUND

In a data communication network, most of traffic models are in a burst mode. Therefore, some methods for limiting network traffic need to be adopted to prevent multiple problems caused by burst traffic from occurring on the network, such as network congestion. A common traffic limiting manner is a token bucket-based manner. There are mainly two common token bucket management technologies: a timing bucket filling mechanism and an event bucket filling mechanism. For the event bucket filling mechanism, when a token bucket consuming event occurs, an operation of filling tokens in a token bucket is triggered, and traffic is limited according to a comparison between the number of tokens in the token bucket and the length of a packet. For a communication network, generally, there are many scheduling nodes under a traffic limiting apparatus, and each scheduling node has a plurality of token buckets, so that a huge number of token buckets exist. By adopting the solution in the prior art, a timestamp of each token bucket is stored generally by adopting an internal memory, and one timestamp is allocated to each token bucket, thereby occupying a large quantity of internal memory resources and further increasing hardware cost.

SUMMARY

A technical problem to be solved by the embodiments of the present invention is as follows: A token bucket-based traffic limiting method and apparatus need to be provided, which can effectively solve problems of over-occupation of storage resources and high hardware cost in the prior art.

To solve the foregoing technical problem, a first aspect of the present invention provides a token bucket-based traffic limiting method, including:

when a packet is received, triggering a filling operation of filling each token bucket in a token bucket set under a scheduling node corresponding to the packet, where the token bucket set includes at least two token buckets;

determining the number of tokens filled in each token bucket in the token bucket set according to a moment when the packet is received and a timestamp shared by the token bucket set, and filling the tokens in each token bucket in the token bucket set according to the determined number of tokens; and allowing the packet to pass through the scheduling node, and removing the number of tokens, corresponding to a length of the packet, from a token bucket corresponding to the packet if the number of tokens in the token bucket corresponding to the packet exceeds the length of the packet.

In a first possible implementation manner, the token bucket-based traffic limiting method further includes:

disallowing the packet to pass through the scheduling node if the number of tokens in the token bucket corresponding to the packet does not exceed the length of the packet.

With reference to the first possible implementation manner of the first aspect, in a second possible implementation manner, the step of determining the number of tokens filled in each token bucket in the token bucket set according to a moment when the packet is received and a timestamp shared by the token bucket set specifically includes:

calculating a time interval according to the moment when the packet is received and the timestamp shared by the token bucket set; and determining the number of tokens filled in each token bucket in the token bucket set according to the time interval and a preset token filling rate.

With reference to the second possible implementation manner of the first aspect, in a third possible implementation manner, after the step of determining the number of tokens filled in each token bucket in the token bucket set according to a moment when the packet is received and a timestamp shared by the token bucket set, the token bucket-based traffic limiting method further includes:

if the sum of the number of tokens filled in the token bucket corresponding to the packet and the number of original tokens is less than a bucket height of the token bucket corresponding to the packet, filling tokens in the token bucket corresponding to the packet until the token bucket corresponding to the packet is equal to the bucket height of the token bucket corresponding to the packet, and discarding tokens exceeding the bucket height if the sum of the number of tokens filled in the token bucket corresponding to the packet and the number of original tokens is greater than a bucket height of the token bucket corresponding to the packet.

With reference to the second possible implementation manner of the first aspect, in a fourth possible implementation manner, after the step of determining the number of tokens filled in each token bucket in the token bucket set according to a moment when the packet is received and a timestamp shared by the token bucket set, the token bucket-based traffic limiting method further includes:

using the moment when the packet is received as a new timestamp shared by each token bucket in the token bucket set.

With reference to any one of the first aspect to the fourth possible implementation manner of the first aspect, in a fifth possible implementation manner, the step of allowing the packet to pass through the scheduling node and removing the number of tokens, corresponding to a length of the packet, from a token bucket corresponding to the packet if the number of tokens in the token bucket corresponding to the packet exceeds the length of the packet specifically includes:

obtaining the length of the packet and the number of original tokens in the token bucket corresponding to the packet;

calculating the number of existing tokens in the token bucket corresponding to the packet according to the number of tokens filled in the token bucket corresponding to the packet and the number of original tokens in the token bucket corresponding to the packet; and determining whether the number of existing tokens in the token bucket corresponding to the packet is greater than the length of the packet, and if so, determining that the number of existing tokens in the token bucket corresponding to the packet exceeds the length of the packet and removing the number of tokens, corresponding to the length of the packet, from the token bucket corresponding to the packet.

A second aspect of the present invention provides a token bucket-based traffic limiting apparatus, including:

a packet triggering module, configured to trigger a filling operation of filling each token bucket in a token bucket set under a scheduling node corresponding to a packet when a packet is received, where the token bucket set includes at least two token buckets;

a token filling module, configured to determine the number of tokens filled in each token bucket in the token bucket set according to a moment when the packet is received and a timestamp shared by the token bucket set, and fill the tokens in each token bucket in the token bucket set according to the determined number of tokens; and a traffic regulating module, configured to allow the packet to pass through the scheduling node and remove the number of tokens, corresponding to a length of the packet, from a token bucket corresponding to the packet if the number of tokens in the token bucket corresponding to the packet exceeds the length of the packet.

In a first possible implementation manner, the token bucket-based traffic limiting apparatus further includes:

a traffic limiting module, configured to disallow the packet to pass through the scheduling node if the number of tokens in the token bucket corresponding to the packet does not exceed the length of the packet.

With reference to the first possible implementation manner of the second aspect, in a second possible implementation manner, the token filling module includes:

a time interval calculating unit, configured to calculate a time interval according to the moment when the packet is received and the timestamp shared by the token bucket set; and a filling number determining unit, configured to determine the number of tokens filled in each token bucket in the token bucket set according to the time interval and a preset token filling rate.

With reference to the second possible implementation manner of the second aspect, in a third possible implementation manner, the token bucket-based traffic limiting apparatus further includes:

a filling limiting module, configured to fill tokens in the token bucket corresponding to the packet until the token bucket corresponding to the packet is equal to a bucket height of the token bucket corresponding to the packet; and if the sum of tokens filled in the token bucket corresponding to the packet and the number of original tokens is greater than the bucket height of the token bucket corresponding to the packet, discard the tokens exceeding the bucket height.

With reference to the second possible implementation manner of the second aspect, in a fourth possible implementation manner, the token bucket-based traffic limiting apparatus further includes:

a timestamp maintaining module, configured to clear an original timestamp shared by each token bucket in the token bucket set, and use the moment when the packet is received as a new timestamp shared by each token bucket in the token bucket set.

With reference to any one of the second aspect to the fourth possible implementation manner of the second aspect, in a fifth possible implementation manner, the traffic limiting module includes:

an obtaining unit, configured to obtain the length of the packet and the number of original tokens in the token bucket corresponding to the packet;

a calculating unit, configured to calculate the number of existing tokens in the token bucket corresponding to the packet according to the number of tokens filled in the token bucket corresponding to the packet and the number of original tokens in the token bucket corresponding to the packet; and a regulating unit, configured to determine whether the number of existing tokens in the token bucket corresponding to the packet is greater than the length of the packet, and if so, determine that the number of existing tokens in the token bucket corresponding to the packet exceeds the length of the packet and remove the number of tokens, corresponding to the length of the packet, from the token bucket corresponding to the packet.

Implementing the embodiments of the present invention has the following beneficial effects:

an operation of filling a token bucket is triggered by receiving a packet and the number of tokens filled in each token bucket is determined according to a timestamp shared by a plurality of token buckets included in a scheduling node and a current arrival moment of the packet. In this way, the plurality of token buckets under each scheduling node save and configure only one timestamp. Compared with an existing solution in which each token bucket is separately configured with one timestamp, storage space of a traffic limiting apparatus is effectively saved and hardware cost is reduced.

BRIEF DESCRIPTION OF DRAWING

To describe the technical solutions in the embodiments of the present invention more clearly, the following briefly introduces the accompanying drawings required for describing the embodiments Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
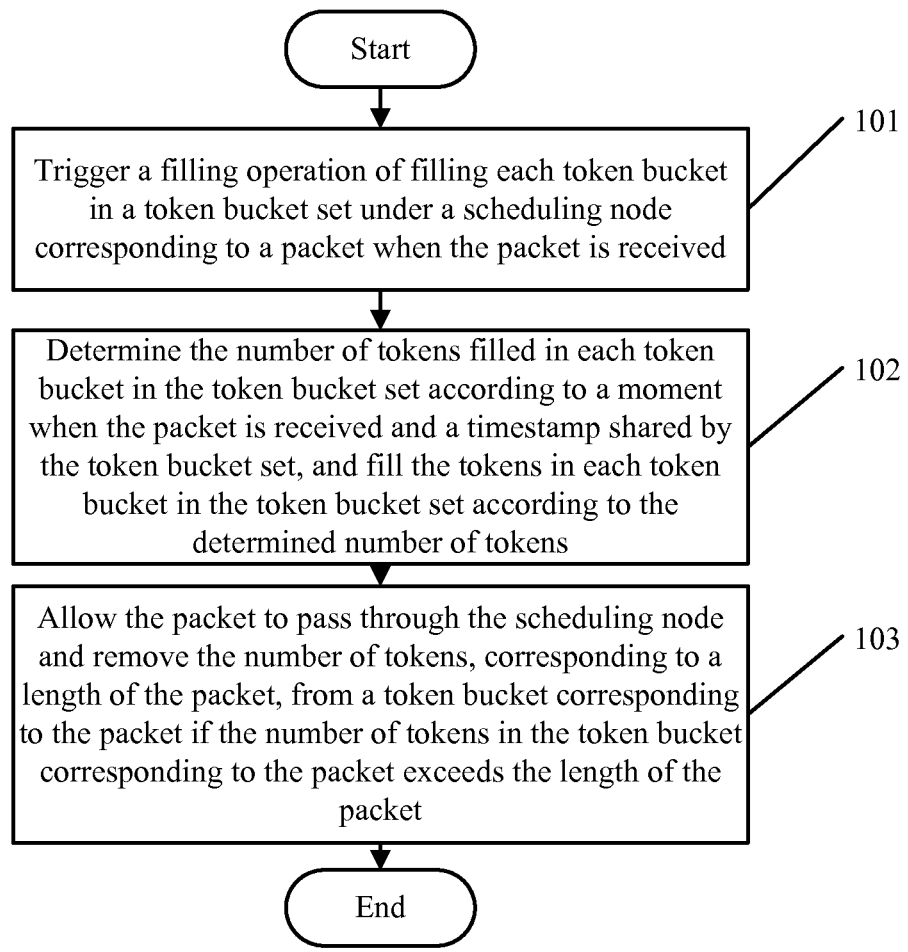
FIG. 1 is a schematic flowchart of a token bucket-based traffic limiting method according to an embodiment of the present invention.

FIG. 1 is a schematic flowchart of a token bucket-based traffic limiting method according to an embodiment of the present invention, where the method includes:

Step 101. Trigger a filling operation of filling each token bucket in a token bucket set under a scheduling node when a packet is received.

Specifically, a traffic limiting apparatus is an apparatus deployed in a network for limiting traffic passing through the apparatus according to a preset policy so as to prevent network breakdown caused by traffic overload on the network. In the embodiment adopting a mechanism for triggering bucket filling by using an event, and the traffic limiting apparatus includes a plurality of scheduling nodes, where each scheduling node includes a plurality of token buckets, each token bucket corresponds to one network branch, and each token bucket is configured to control traffic of a packet passing through a branch corresponding to the token bucket. When the packet passes through a certain scheduling node under the traffic limiting apparatus, the traffic limiting apparatus executes the filling operation of filling each token bucket in the token bucket set under the scheduling node, where the token bucket set includes at least two token buckets.

Step 102. Determine the number of tokens filled in each token bucket in the token bucket set according to a moment when the packet is received and a timestamp shared by the token bucket set, and fill the tokens in each token bucket in the token bucket set according to the determined number of tokens.

Specifically, the timestamp shared by each token bucket in the token bucket set is a moment when a packet was received last time. In the embodiment of the present invention, a time interval between two filling operations may be determined according to the moment when the packet is currently received and the moment when a packet was received last time; therefore, the traffic limiting apparatus determines the number of tokens filled in each token bucket in the token bucket set according to a preset token filling rate and the time interval and fills the tokens in each token bucket in the token bucket set according to the determined number of tokens.

Step 103. Allow the packet to pass through the scheduling node and remove the number of tokens, corresponding to a length of the packet, from a token bucket corresponding to the packet if the number of tokens in the token bucket corresponding to the packet exceeds the length of the packet.

Specifically, the number of tokens in the token bucket corresponding to the packet is the sum of the number of original tokens in the token bucket and the number of tokens filled in step 102. Whether the length of the packet is less than the number of tokens in the token bucket corresponding to the packet is determined, and if so, the packet is allowed to pass through the scheduling node; meanwhile, the number of tokens, corresponding to the length of the packet, needs to be consumed in the token bucket corresponding to the packet.

By implementing the embodiment of the present invention, an operation of filling a token bucket is triggered by receiving a packet, and meanwhile, the number of tokens filled in each token bucket is determined according to a timestamp shared by a plurality of token buckets included in a scheduling node and a current arrival moment of the packet. In this way, the plurality of token buckets under each scheduling node save and configure only one timestamp. Compared with an existing solution in which each token bucket is separately configured with one timestamp, the embodiment of the present invention may effectively save storage space of a traffic limiting apparatus and reduce hardware cost; and in particular, the effect of reducing the cost is remarkable under a condition in which there are many scheduling nodes under the traffic limiting apparatus and each scheduling node has a plurality of token buckets.

Figure 2:
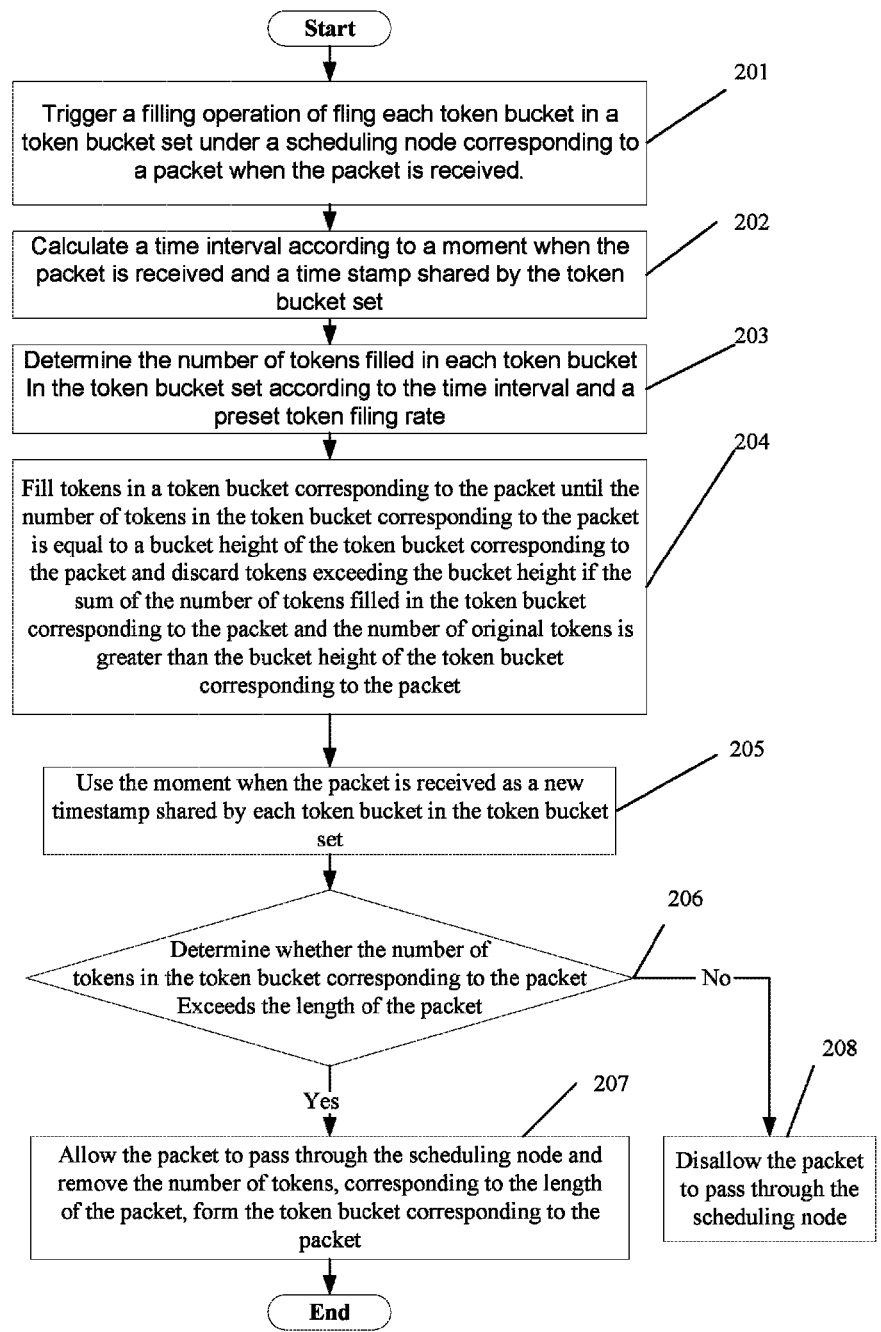
FIG. 2 is another schematic flowchart of a token bucket-based traffic limiting method according to an embodiment of the present invention.

FIG. 2 is another schematic flowchart of a token bucket-based traffic limiting method according to an embodiment of the present invention, where the method includes:

Step 201. Trigger a filling operation of filling each token bucket in a token bucket set under a scheduling node corresponding to a packet when the packet is received.

Specifically, a traffic limiting apparatus is an apparatus deployed in a network for limiting traffic passing through the apparatus according to a preset policy so as to prevent network breakdown caused by traffic overload on the network. The embodiment adopts a mechanism for triggering bucket filling by using an event. Assume that the traffic limiting apparatus includes four scheduling nodes, respectively a scheduling node A, a scheduling node B, a scheduling node C and a scheduling node D, where each scheduling node includes a token bucket set, and the token bucket set includes at least two token buckets; and assume that there are four token buckets in the token bucket set under the scheduling node, respectively marked A{a1,a2,a3,a4}, B{b1,b2,b3,b4}, C{c1,c2,c3,c4} and D{d1,d2,d3,d4}, each token bucket corresponds to one network branch, and each token bucket is used to control traffic of a packet passing through the branch corresponding to the token bucket. Assuming that when the packet passes through the token bucket a1 in the token bucket set under the scheduling node A under the traffic limiting apparatus, the traffic limiting apparatus executes a filling operation of filling each token bucket, that is, a1, a2, a3 and a4 token buckets, in the token bucket set of the scheduling node A.

Step 202. Calculate a time interval according to a moment when the packet is received and a timestamp shared by the token bucket set.

In the embodiment of the present invention, the timestamp is configured to record previous arrival time of a packet of the scheduling node corresponding to the packet, or previous filling time of the token bucket.

Specifically, assuming that the moment when the packet is received is marked CurrentTime and the timestamp shared by the token bucket set is marked LastTime, the time interval ΔT is equal to CurrentTime—LastTime.

Step 203. Determine the number of tokens filled in each token bucket in the token bucket set according to the time interval and a preset token filling rate.

Specifically, assuming that the preset token filling rate is marked Rate, the number of tokens filled in each token bucket in the token bucket set is marked TokenAddition=Rate*ΔT according to the time interval calculated in step 202. For an example in step 201, the number of tokens filled in each token bucket in the token bucket set A{a1,a2,a3,a4} of the scheduling node A is marked TokenAddition=Rate*ΔT.

In the embodiment, the timestamp is shared by the token buckets in the token bucket set under the scheduling node, which may effectively save storage space of the traffic limiting apparatus and reduce hardware cost, and does not affect a traffic regulating function of the scheduling node. Assuming that there are 512K scheduling nodes inside the traffic limiting apparatus, each scheduling node has four token buckets, and a timestamp bit width of the token bucket under each scheduling node is 20 bits, the consumed storage resource is 512K*4*20 bit=40960 Kbit=40 Mbit. By adopting the embodiment of the present invention, one timestamp is shared by four token buckets of each scheduling node, which consumes on-chip storage resources of 512K*1*20 bit=10240 Kbit=10 Mbit; and after the timestamp is shared by the token buckets under the scheduling node, the storage resources of 30 Mbit may be saved, and therefore cost is remarkably lowered.

Step 204. Fill the tokens in a token bucket corresponding to the packet until the token bucket corresponding to the packet is equal to a bucket height of the token bucket corresponding to the packet and discard the remaining tokens if the sum of tokens filled in the token bucket corresponding to the packet and the number of original tokens is greater than the bucket height of the token bucket corresponding to the packet.

In the embodiment of the present invention,

Specifically, in the example in step 201, assuming that the bucket height of the token bucket a1 is H and the number of original tokens in the token bucket a1 is marked OldToken, the sum of the number of tokens filled in the token bucket a1 and the number of original tokens in the token bucket a1 is TokenAddition+OldToken, and the number of existing tokens in the token bucket a1 is marked NewToken. If a condition of TokenAddition+OldToken≥H is met, NewToken=H, that is, tokens exceeding the bucket height are discarded; and if a condition of TokenAddition+OldToken<H is met, NewToken=TokenAddition+OldToken. For other token buckets in the token bucket set, such method is also adopted to limit the number of tokens in the token buckets.

Step 205. Use the moment when the packet is received as a new timestamp shared by each token bucket in the token bucket set.

Specifically, assuming that the moment when the packet is received is marked CurrentTime, an original timestamp shared by the token bucket set is marked LastTime, the traffic limiting apparatus clears the stored LastTime value and uses the CurrentTime value as a new timestamp shared by the token bucket set.

Step 206. Determine whether the number of tokens in the token bucket corresponding to the packet exceeds the length of the packet; if so, execute step 207, and if no, execute step 208.

Specifically, assuming that the length of the packet is M, the token bucket corresponding to the packet is a1 and the number of tokens in a1 is marked NewToken, determine whether NewToken is greater than M; if so, execute step 207, and if no, execute step 208.

Step 207. Allow the packet to pass through the scheduling node and remove the number of tokens, corresponding to the length of the packet, from the token bucket corresponding to the packet.

Specifically, the traffic limiting apparatus allows the packet to pass through the scheduling node and the number of tokens in the token bucket corresponding to the packet is updated to NewToken—M.

Step 208. Disallow the packet to pass through the scheduling node.

By implementing the embodiment of the prevent invention, an operation of filling a token bucket is triggered by receiving a packet, and the number of tokens filled in each token bucket is determined according to a timestamp shared by a plurality of token buckets included in a scheduling node and a current arrival moment of the packet. In this way, the plurality of token buckets under each scheduling node only save and configure one timestamp. Compared with an existing solution in which each token bucket is separately configured with one timestamp, the embodiment of the present invention may effectively save storage space of a traffic limiting apparatus and reduce hardware cost; and in particular, the effect of reducing the cost is remarkable under a condition in which there are many scheduling nodes under the traffic limiting apparatus and each scheduling node has a plurality of token buckets.

Figure 3:
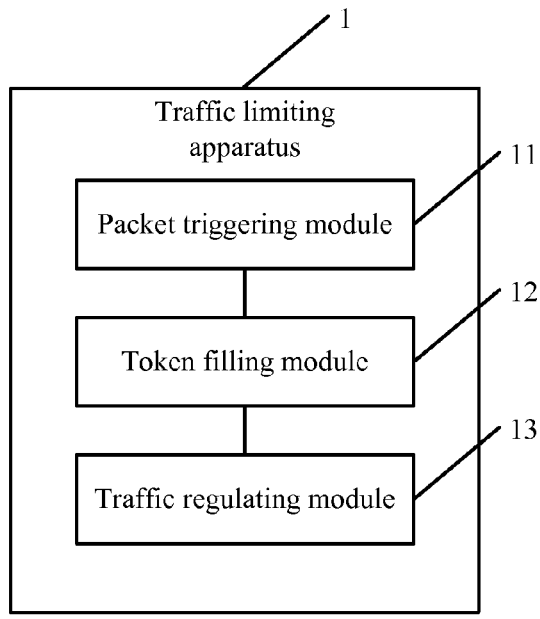
FIG. 3 is a schematic structural diagram of a token bucket-based traffic limiting apparatus according to an embodiment of the present invention.

FIG. 3 is a schematic structural diagram of a token bucket-based traffic limiting apparatus according to an embodiment of the present invention, hereinafter referred to as a traffic limiting apparatus, including:

a packet triggering module 11, configured to trigger a filling operation of filling each token bucket in a token bucket set under a scheduling node corresponding to a packet, where the token bucket set includes at least two token buckets.

Specifically, the traffic limiting apparatus is an apparatus deployed in a network for limiting traffic passing through the apparatus according to a preset policy so as to prevent network breakdown caused by traffic overload on the network. In the embodiment adopting a mechanism for triggering bucket filling by using an event, the traffic limiting apparatus includes a plurality of scheduling nodes, where each scheduling node includes a plurality of token buckets, each token bucket corresponds to one network branch, and each token bucket is used to control traffic of a packet passing through the branch corresponding to the token bucket. When receiving a packet passing through a certain scheduling node, the packet triggering module 11 executes the filling operation of filling each token bucket in the token bucket set under the scheduling node, where the token bucket set includes at least two token buckets.

a token filling module 12, configured to determine the number of tokens filled in each token bucket in the token bucket set according to a moment when the packet is received and a timestamp shared by the token bucket set, and fill the tokens in each token bucket in the token bucket set according to the determined number of tokens.

Specifically, the timestamp shared by each token bucket in the token bucket set is a moment when a packet was received last time. The token filling module 12 determines a time interval between two filling operations according to the moment when the packet is currently received and the moment when a packet was received last time, and determines the number of tokens filled in each token bucket in the token bucket set according to a preset token filling rate and the time interval.

a traffic regulating module 13, configured to allow the packet to pass through the scheduling node and remove the number of tokens, corresponding to a length of the packet, from a token bucket corresponding to the packet if the number of tokens in the token bucket corresponding to the packet exceeds the length of the packet.

Specifically, the number of tokens in the token bucket corresponding to the packet is the sum of the number of original tokens in the token bucket and the number of tokens filled by the token filling module 12. The traffic regulating module 13 determines whether the length of the packet is less than the number of tokens in the token bucket corresponding to the packet, and if so, allows the packet to pass through the scheduling node; meanwhile, the number of tokens, corresponding to the length of the packet, needs to be consumed in the token bucket corresponding to the packet.

By implementing the embodiment of the present invention, an operation of filling a token bucket is triggered by receiving a packet, and meanwhile, the number of tokens filled in each token bucket is determined according to a timestamp shared by a plurality of token buckets included in a scheduling node and a current arrival moment of the packet. In this way, the plurality of token buckets under each scheduling node save and configure only one timestamp. Compared with an existing solution in which each token bucket is separately configured with one timestamp, the embodiment of the present invention may effectively save storage space of a traffic limiting apparatus and reduce hardware cost; and in particular, the effect of reducing the cost is remarkable under a condition in which there are many scheduling nodes under the traffic limiting apparatus and each scheduling node has a plurality of token buckets.

Figure 4:
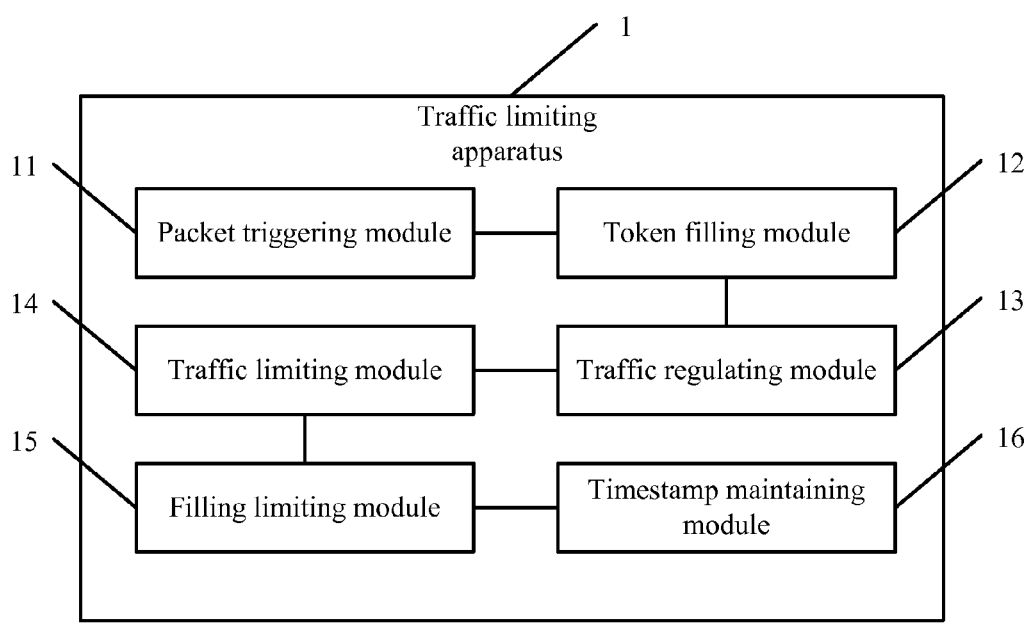
FIG. 4 is another schematic structural diagram of a token bucket-based traffic limiting apparatus according to an embodiment of the present invention.
Figure 5:
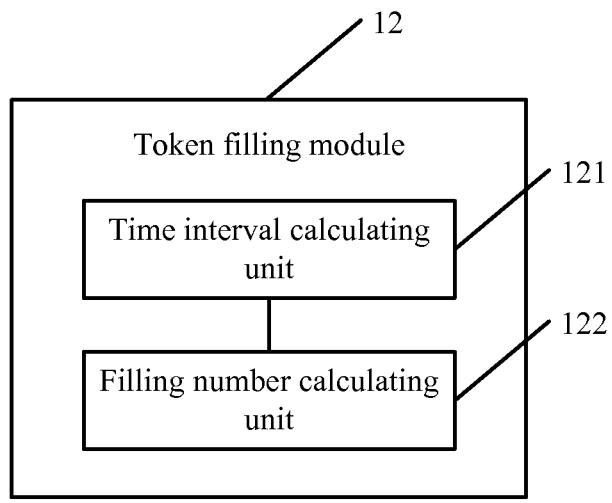
FIG. 5 is a schematic structural diagram of a token filling module in FIG. 4.
Figure 6:
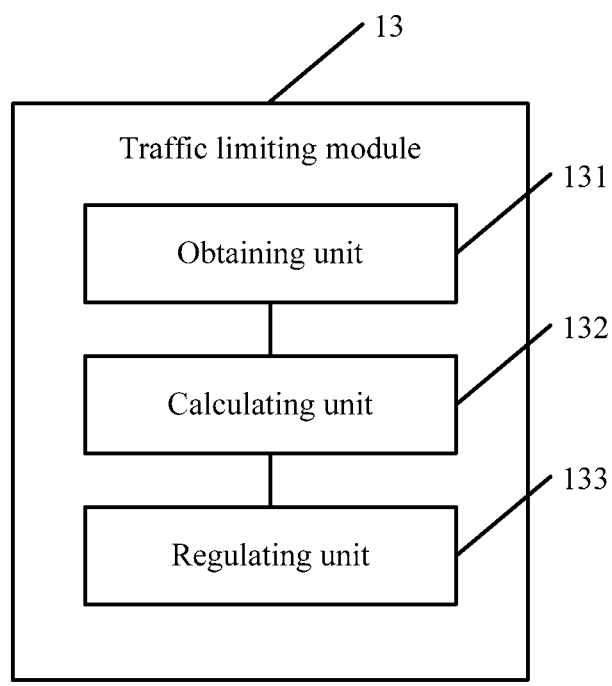
FIG. 6 is a schematic structural diagram of a traffic limiting module in FIG. 4.

Further, FIG. 4 to FIG. 6 are another schematic structural diagrams of a token bucket-based traffic limiting apparatus according to embodiments of the present invention, where except the packet triggering module 11, the token filling module 12 and the traffic limiting module 13, the token bucket-based traffic limiting apparatus further includes:

a traffic limiting module 14, configured to disallow the packet to pass through the scheduling node if the number of tokens in the token bucket corresponding to the packet does not exceed the length of the packet.

a filling limiting module 15, configured to fill tokens in the token bucket corresponding to the packet until the token bucket corresponding to the packet is equal to a bucket height of the token bucket corresponding to the packet; and if the sum of the number of tokens filled in the token bucket corresponding to the packet and the number of original tokens is greater than the bucket height of the token bucket corresponding to the packet, discard the tokens exceeding the bucket height.

Specifically, in the example in step 201, assuming that the bucket height of the token bucket a1 is H and the number of original tokens in the token bucket a1 is marked OldToken, the sum of the number of tokens filled in the token bucket a1 and the number of original tokens in the token bucket a1 is TokenAddition+OldToken; the number of existing tokens in the token bucket a1 is marked NewToken. The filling limiting module 15 determines whether a condition of TokenAddition+OldToken≥H is met; if so, NewToken=H, that is, the tokens exceeding the bucket height are discarded; otherwise, NewToken=TokenAddition+OldToken. For other token buckets in the token bucket set, such method is also adopted to limit the number of tokens in the token buckets.

a timestamp maintaining module 16, configured to use the moment when the packet is received as a new timestamp shared by each token bucket in the token bucket set.

The timestamp maintaining module 16 maintains a timestamp, where the timestamp is configured to record previous arrival time of a packet of each scheduling node or previous filling time of a token bucket.

Specifically, assuming that the moment when the packet is received is marked CurrentTime, where CurrentTime indicates current arrival time of the packet or current filling time of the token bucket; and an original timestamp shared by the token bucket set is marked LastTime, where LastTime indicates previous arrival time of a packet or previous filling time of the token bucket. The timestamp maintaining module 16 clears a LastTime value, and uses a CurrentTime value as a new timestamp shared by each token bucket in the token bucket set.

The token filling module 12 includes:

a time interval calculating unit 121, configured to calculate a time interval according to the moment when the packet is received and the timestamp shared by the token bucket set; and a filling number determining unit 122, configured to determine the number of tokens filled in each token bucket in the token bucket set according to the time interval and a preset token filling rate.

The traffic limiting module 13 includes:

an obtaining unit 131, configured to obtain the length of the packet and the number of original tokens in the token bucket corresponding to the packet;

a calculating unit 132, configured to calculate the number of existing tokens in the token bucket corresponding to the packet according to the number of tokens filled in the token bucket corresponding to the packet and the number of original tokens in the token bucket corresponding to the packet; and a regulating unit 133, configured to determine whether the number of existing tokens in the token bucket corresponding to the packet is greater than the length of the packet, and if so, determine that the number of existing tokens in the token bucket corresponding to the packet exceeds the length of the packet and remove the number of tokens, corresponding to the length of the packet, from the token bucket corresponding to the packet.

By implementing the embodiment of the present invention, an operation of filling a token bucket is triggered by receiving a packet, and meanwhile, the number of tokens filled in each token bucket is determined according to a timestamp shared by a plurality of token buckets included in a scheduling node and a current arrival moment of the packet. In this way, the plurality of token buckets under each scheduling node save and configure only one timestamp. Compared with an existing solution in which each token bucket is separately configured with one timestamp, the embodiment of the present invention may effectively save storage space of a traffic limiting apparatus and reduce hardware cost; and in particular, the effect of reducing the cost is remarkable under a condition in which there are many scheduling nodes under the traffic limiting apparatus and each scheduling node has a plurality of token buckets.

Figure 7:
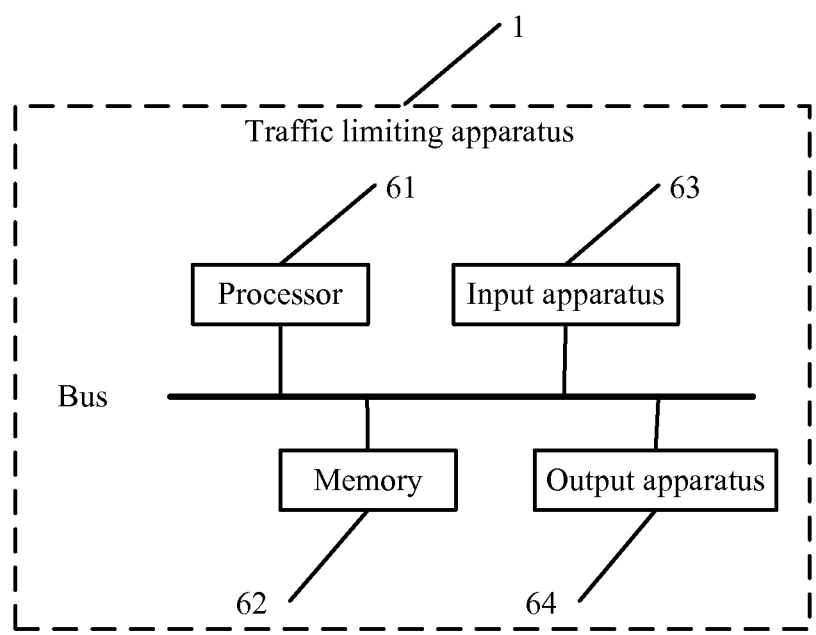
FIG. 7 is still another schematic structural diagram of a token bucket-based traffic limiting apparatus according to an embodiment of the present invention.

FIG. 7 is still another schematic structural diagram of a token bucket-based traffic limiting apparatus according to an embodiment of the present invention, including a processors 61, a memory 62, an input apparatus 63 and an output apparatus 64, where the number of processors 61 in the traffic limiting apparatus 1 may be one or more, and one processor is used as an example in FIG. 7. In some embodiments of the present invention, the processor 61, the memory 62, the input apparatus 63 and the output apparatus 64 may be connected by a bus or in other manners, and a bus connection is used as an example in FIG. 7.

One group of program code is stored in the memory 62, and the processor 61 is configured to call the program code stored in the memory 62 to execute the following operations:

triggering a filling operation of filling each token bucket in a token bucket set under a scheduling node corresponding to a packet when the packet is received, where the token bucket set includes at least two token buckets;

determining the number of tokens filled in each token bucket in the token bucket set according to a moment when the packet is received and a timestamp shared by the token bucket set, and filling the tokens in each token bucket in the token bucket set according to the determined number of tokens; and allowing the packet to pass through the scheduling node and removing the number of tokens, corresponding to a length of the packet, from a token bucket corresponding to the packet if the number of tokens in the token bucket corresponding to the packet exceeds the length of the packet.

Further, in some embodiments of the present invention, the processor 61 is further configured to:

disallow the packet to pass through the scheduling node if the number of tokens in the token bucket corresponding to the packet does not exceed the length of the packet.

In some embodiments of the present invention, the processor 61 is configured to:

calculate a time interval according to the moment when the packet is received and the timestamp shared by the token bucket set; and determine the number of tokens filled in each token bucket in the token bucket set according to the time interval and a preset token filling rate.

In some embodiments of the present invention, the processor 61 is further configured to:

if the sum of the number of tokens filled in the token bucket corresponding to the packet and the number of original tokens is less than a bucket height of the token bucket corresponding to the packet, fill tokens in the token bucket corresponding to the packet until the token bucket corresponding to the packet is equal to the bucket height of the token bucket corresponding to the packet, and discard tokens exceeding the bucket height, if the sum of the number of tokens filled in the token bucket corresponding to the packet and the number of original tokens is greater than a bucket height of the token bucket corresponding to the packet.

In some embodiments of the present invention, the processor 61 is configured to:

use the moment when the packet is received as a new timestamp shared by each token bucket in the token bucket set.

In some embodiments of the present invention, the processor 61 is configured to:

obtain the length of the packet and the number of original tokens in the token bucket corresponding to the packet;

calculate the number of existing tokens in the token bucket corresponding to the packet according to the number of tokens filled in the token bucket corresponding to the packet and the number of original tokens in the token bucket corresponding to the packet; and determine whether the number of existing tokens in the token bucket corresponding to the packet is greater than the length of the packet, and if so, determine that the number of existing tokens in the token bucket corresponding to the packet exceeds the length of the packet and remove the number of tokens, corresponding to the length of the packet, from the token bucket corresponding to the packet.

By implementing the embodiment of the present invention, an operation of filling a token bucket is triggered by receiving a packet, and meanwhile, the number of tokens filled in each token bucket is determined according to a timestamp shared by the plurality of token buckets included in a scheduling node and a current arrival moment of the packet. In this way, the plurality of token buckets under each scheduling node save and configure only one timestamp. Compared with an existing solution in which each token bucket is separately configured with one timestamp, the embodiment of the present invention may effectively save storage space of a traffic limiting apparatus and reduce hardware cost; and in particular, the effect of reducing the cost is remarkable under a condition in which there are many scheduling nodes under the traffic limiting apparatus and each scheduling node has a plurality of token buckets.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

The foregoing descriptions disclosed are merely exemplary embodiments of the present invention, which may certainly not be used for limiting the scope of the claims of the present invention. A person of ordinary skill in the art may understand and implement all or a part of the processes of the embodiments, and equivalent changes made according to the claims of the present invention still fall within the scope of the present invention.

What is claimed is:

1. A token bucket-based traffic limiting method, comprising:

when a packet is received, triggering a filling operation of filling each token bucket in a token bucket set under a scheduling node corresponding to the packet, wherein the token bucket set comprises at least two token buckets;

determining a number of tokens filled in each token bucket in the token bucket set according to a time interval and a preset token filling rate, wherein the time interval is a time difference between a first time when a previous packet was received and a second time when the packet is currently received, wherein the first time when the previous packet was received is used as a timestamp shared by the token buckets in the token bucket set, and filling the tokens in each token bucket in the token bucket set according to the determined number of the tokens; and allowing the packet to pass through the scheduling node and removing tokens whose quantity corresponds to a length of the packet, from a token bucket corresponding to the packet if the number of tokens in the token bucket corresponding to the packet exceeds the length of the packet.

2. The method according to claim 1, further comprising:

disallowing the packet to pass through the scheduling node if the number of tokens in the token bucket corresponding to the packet does not exceed the length of the packet.

3. The method according to claim 1, after the determining the number of tokens filled in each token bucket in the token bucket set, the method further comprising:

if a sum of the number of tokens filled in the token bucket corresponding to the packet and the number of original tokens is less than a bucket height of the token bucket corresponding to the packet, filling tokens in the token bucket corresponding to the packet until the number of tokens in the token bucket corresponding to the packet is equal to the bucket height of the token bucket corresponding to the packet.

4. The method according to claim 1, wherein after the determining the number of tokens filled in each token bucket in the token bucket set, the method further comprising:

using the moment when the packet is received as a new timestamp shared by each token bucket in the token bucket set.

5. The method according to claim 1, wherein the allowing the packet to pass through the scheduling node and removing the tokens whose quantity corresponds to a length of the packet, from the token bucket corresponding to the packet if the number of tokens in the token bucket corresponding to the packet exceeds the length of the packet further comprises:

obtaining the length of the packet and the number of original tokens in the token bucket corresponding to the packet;

calculating the number of existing tokens in the token bucket corresponding to the packet according to the number of tokens filled in the token bucket corresponding to the packet and the number of original tokens in the token bucket corresponding to the packet; and determining whether the number of existing tokens in the token bucket corresponding to the packet is greater than the length of the packet, and if the number of existing tokens in the token bucket corresponding to the packet is greater than the length of the packet, determining that the number of existing tokens in the token bucket corresponding to the packet exceeds the length of the packet and removing the tokens whose quantity corresponds to the length of the packet, from the token bucket corresponding to the packet.

6. A token bucket-based traffic limiting apparatus, comprising a processor and a non-transitory processor-readable medium having processor-executable instructions stored thereon, the processor-executable instructions including a plurality of modules, the modules including:

a packet triggering module, configured to trigger a filling operation of filling each token bucket in a token bucket set under a scheduling node corresponding to a packet when the packet is received, wherein the token bucket set comprises at least two token buckets;

a token filling module, configured to determine a number of tokens filled in each token bucket in the token bucket set according to a time interval and a preset token filling rate, wherein the time interval is a time difference between a first time when a previous packet was received and a second time when the packet is currently received, wherein the first time when the previous packet was received is used as a timestamp shared by the token bucket set and fill the tokens in each token bucket in the token bucket set according to the determined number of the tokens; and a traffic regulating module, configured to allow the packet to pass through the scheduling node and remove tokens whose quantity corresponds to a length of the packet, from a token bucket corresponding to the packet if the number of tokens in the token bucket corresponding to the packet exceeds the length of the packet.

7. The apparatus according to claim 6, further comprising:
a traffic limiting module, configured to disallow the packet to pass through the scheduling node if the number of tokens in the token bucket corresponding to the packet does not exceed the length of the packet.

8. The apparatus according to claim 6, wherein the token filling module comprises:
a time interval calculating unit, configured to calculate the time interval; and
a filling number determining unit, configured to determine the number of tokens filled in each token bucket in the token bucket set according to the time interval and the preset token filling rate.

9. The apparatus according to claim 8, further comprising:
a filling limiting module, configured to fill tokens in the token bucket corresponding to the packet until the number of tokens in the token bucket corresponding to the packet is equal to a bucket height of the token bucket corresponding to the packet if a sum of the number of tokens filled in the token bucket corresponding to the packet and the number of original tokens is less than the bucket height of the token bucket corresponding to the packet.

10. The apparatus according to claim 8, further comprising:
a timestamp maintaining module, configured to use the moment when the packet is received as a new timestamp shared by each token bucket in the token bucket set.

11. The apparatus according to claim 6, wherein the traffic limiting module comprises:
an obtaining unit, configured to obtain the length of the packet and the number of original tokens in the token bucket corresponding to the packet;
a calculating unit, configured to calculate the number of existing tokens in the token bucket corresponding to the packet according to the number of tokens filled in the token bucket corresponding to the packet and the number of original tokens in the token bucket corresponding to the packet; and
a regulating unit, configured to determine whether the number of existing tokens in the token bucket corresponding to the packet is greater than the length of the packet, and if the number of existing tokens in the token bucket corresponding to the packet is greater than the length of the packet, determine that the number of existing tokens in the token bucket corresponding to the packet exceeds the length of the packet and remove tokens whose quantity corresponds to the length of the packet, from the token bucket corresponding to the packet.

12. A computer program product comprising a non-transitory computer readable medium containing program instructions executable by one or more processors for limiting token bucket-based traffic through a scheduling node when a packet is received by:

filling tokens in each token bucket in a token bucket set according to a time interval and a preset token filling rate, wherein the time interval is a time between receipt of consecutive packets, and a time when a previous packet is received is a timestamp shared by the token buckets in the token bucket set;

allowing the packet to pass through the scheduling node; and removing a quantity of the tokens from one of the token bucket associated with the packet if a number of tokens in the token bucket exceeds the length of the packet.

13. The computer program product according to claim 12, further comprising program instructions for:
disallowing the packet to pass through the scheduling node if the number of tokens in the token bucket corresponding to the packet does not exceed the length of the packet.

14. The computer program product according to claim 12, further comprising program instructions for:
after the determining the number of tokens filled in each token bucket in the token bucket set, if a sum of the number of tokens filled in the token bucket corresponding to the packet and the number of original tokens is less than a bucket height of the token bucket corresponding to the packet, filling tokens in the token bucket corresponding to the packet until the number of tokens in the token bucket corresponding to the packet is equal to the-bucket height of the token bucket corresponding to the packet.

15. The computer program product according to claim 12, further comprising program instructions for:
after the determining the number of tokens filled in each token bucket in the token bucket set, using the moment when the packet is received as a new timestamp shared by each token bucket in the token bucket set.

16. The computer program product according to claim 12, wherein the program instructions for allowing the packet to pass through the scheduling node and removing the tokens whose quantity corresponds to a length of the packet, from the token bucket corresponding to the packet if the number of tokens in the token bucket corresponding to the packet exceeds the length of the packet further comprises:

- obtaining the length of the packet and the number of original tokens in the token bucket corresponding to the packet;
- calculating the number of existing tokens in the token bucket corresponding to the packet according to the number of tokens filled in the token bucket corresponding to the packet and the number of original tokens in the token bucket corresponding to the packet; and
- determining whether the number of existing tokens in the token bucket corresponding to the packet is greater than the length of the packet, and if the number of existing tokens in the token bucket corresponding to the packet is greater than the length of the packet,
- determining that the number of existing tokens in the token bucket corresponding to the packet exceeds the length of the packet and removing the tokens whose quantity corresponds to the length of the packet, from the token bucket corresponding to the packet.

17. The method according to claim 1, after the determining the number of tokens filled in each token bucket in the token bucket set according to the moment when the packet is received and the timestamp shared by the token bucket set, the method further comprising:

- when a sum of the number of the tokens filled in the token bucket corresponding to the packet and the number of original tokens is greater than a bucket height of the token bucket corresponding to the packet, filling tokens in the token bucket corresponding to the packet until the number of tokens in the token bucket corresponding to the packet is equal to the bucket height of the token bucket corresponding to the packet; and
- discarding tokens exceeding the bucket height, if a sum of the number of tokens filled in the token bucket corresponding to the packet and the number of original tokens is greater than a bucket height of the token bucket corresponding to the packet.

* * * * *